(12) United States Patent
 Drew

(10) Patent No.: US 9,074,381 B1
(45) Date of Patent: Jul. 7, 2015

(54) TILE LAYING MACHINE AND A METHOD OF USE

(71) Applicant: Gary Lee Drew, DePere, WI (US)

(72) Inventor: Gary Lee Drew, DePere, WI (US)

( * ) Notice: Subject to any disclaimer, the term of this patent is extended or adjusted under 35 U.S.C. 154(b) by 0 days.

(21) Appl. No.: 14/261,629

(22) Filed: Apr. 25, 2014

(51) Int. Cl.
 *E04B 1/00* (2006.01)
 *B25J 5/00* (2006.01)
 *E04G 21/22* (2006.01)

(52) U.S. Cl.
 CPC .. *E04G 21/22* (2013.01); *B25J 5/00* (2013.01)

(58) Field of Classification Search
 CPC .................................. E04G 21/22; B25J 5/00
 USPC .................. 52/747.11, 749.1, 749.14, 749.15
 See application file for complete search history.

(56) References Cited

U.S. PATENT DOCUMENTS

| | | | |
|---|---|---|---|
| 2,835,175 A | 9/1953 | Frey | |
| 3,678,645 A | 7/1972 | Valdes | |
| 4,583,879 A | 4/1986 | Hofman | |
| 4,827,689 A * | 5/1989 | Lonardi et al. | 52/749.15 |
| 5,018,923 A * | 5/1991 | Melan et al. | 414/10 |
| 5,284,000 A * | 2/1994 | Milne et al. | 52/749.14 |
| 5,516,254 A | 5/1996 | Gessler | |
| 5,863,169 A | 1/1999 | Inkeroinen | |
| 8,166,727 B2 * | 5/2012 | Pivac et al. | 52/749.14 |
| 2003/0172511 A1 * | 9/2003 | Thompson | 29/283 |

FOREIGN PATENT DOCUMENTS

| | | |
|---|---|---|
| CN | 201714046 U | 1/2011 |
| CN | 102277955 A | 12/2011 |
| EP | 2157259 A1 | 2/2010 |
| JP | 4302660 A | 10/1992 |
| NL | 1037930 C | 11/2011 |
| WO | 2011144003 A1 | 11/2011 |

OTHER PUBLICATIONS

Khaw Boon Wan, To save on construction costs, consider using robots—May 20, 2014, www.youtube.com video screen shots, https://www.youtube.com/watch?v=njlqxafip8E, published May, 20, 2014, 26 pages, blogpost today(May 20), Singapore.

* cited by examiner

*Primary Examiner* — Basil Katcheves
(74) *Attorney, Agent, or Firm* — Thomas J. Connelly; Wilhelm Law, S.C.

(57) ABSTRACT

A robotic tile laying machine and a method of use.

20 Claims, 10 Drawing Sheets

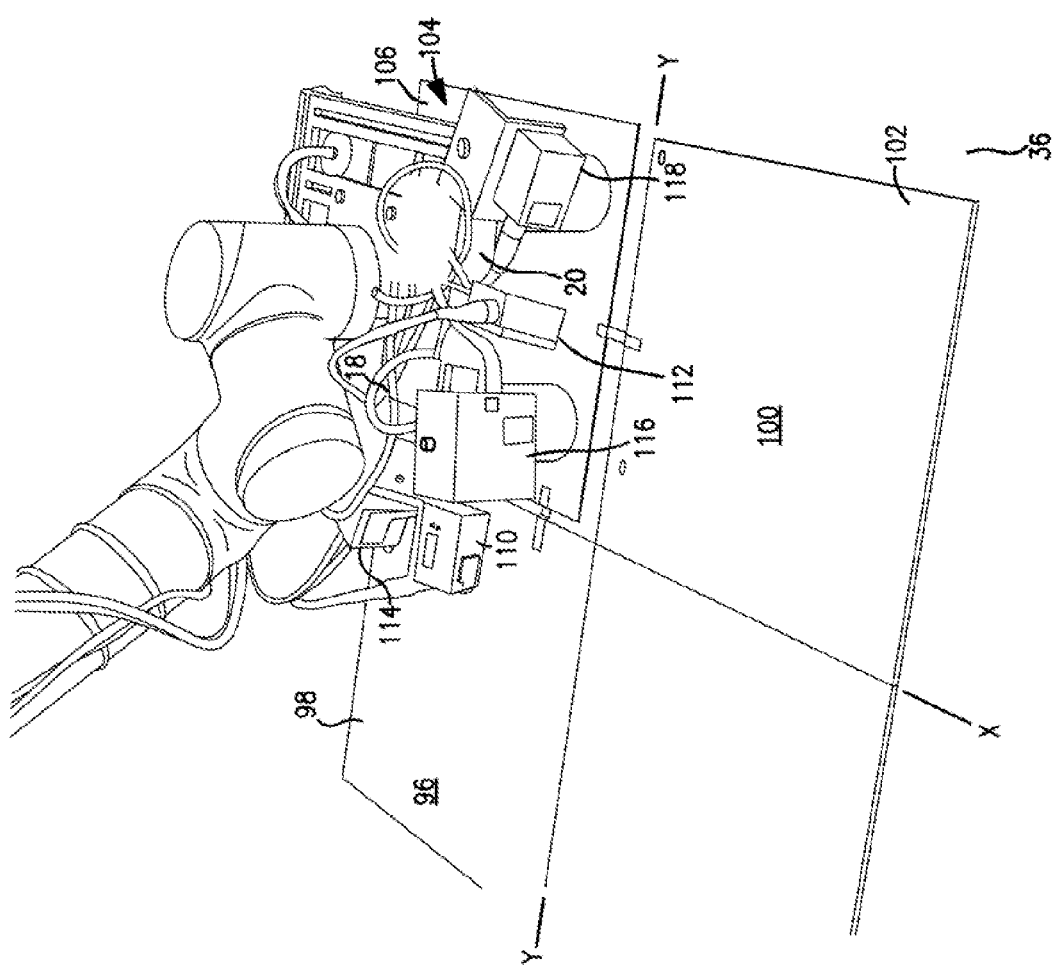

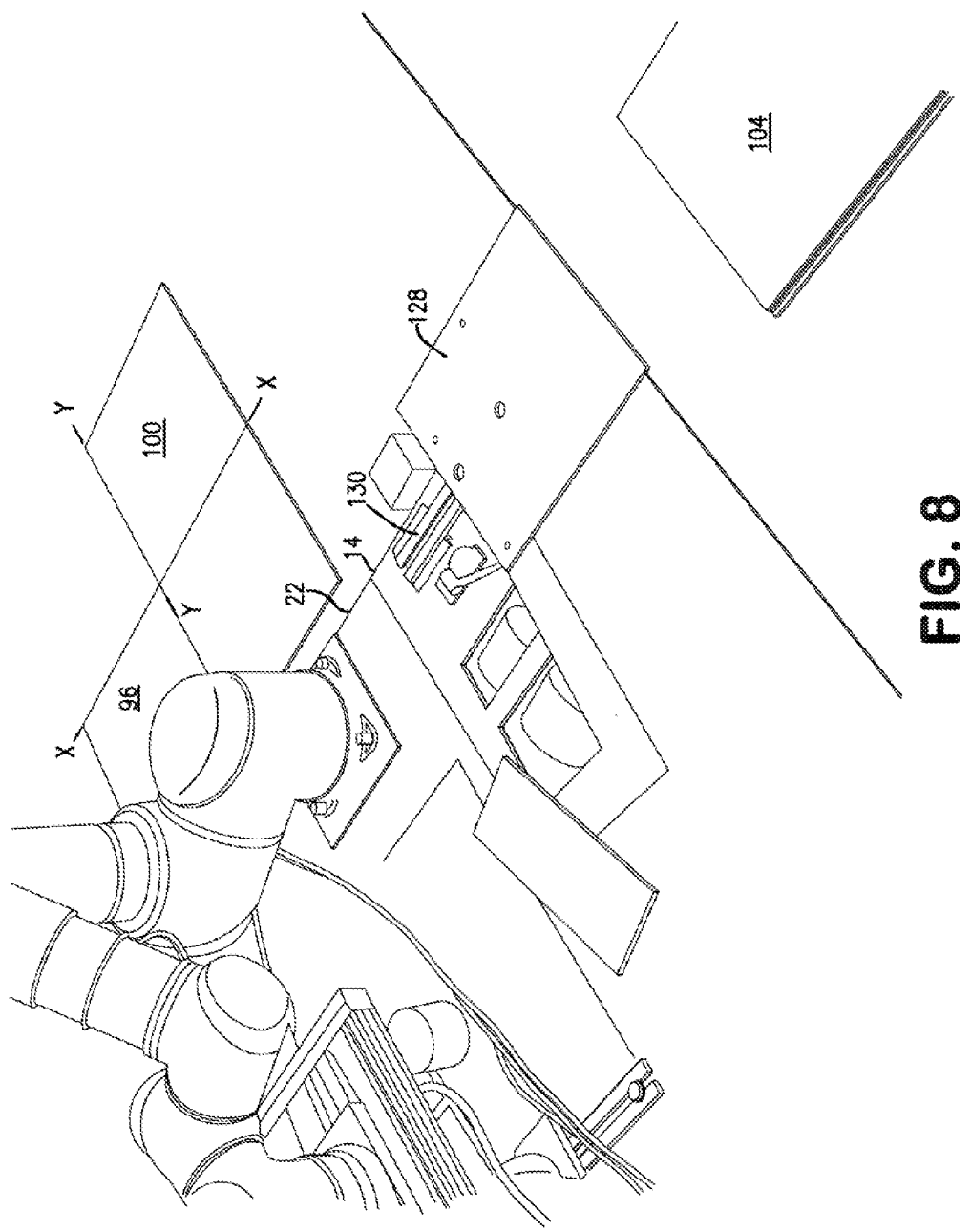

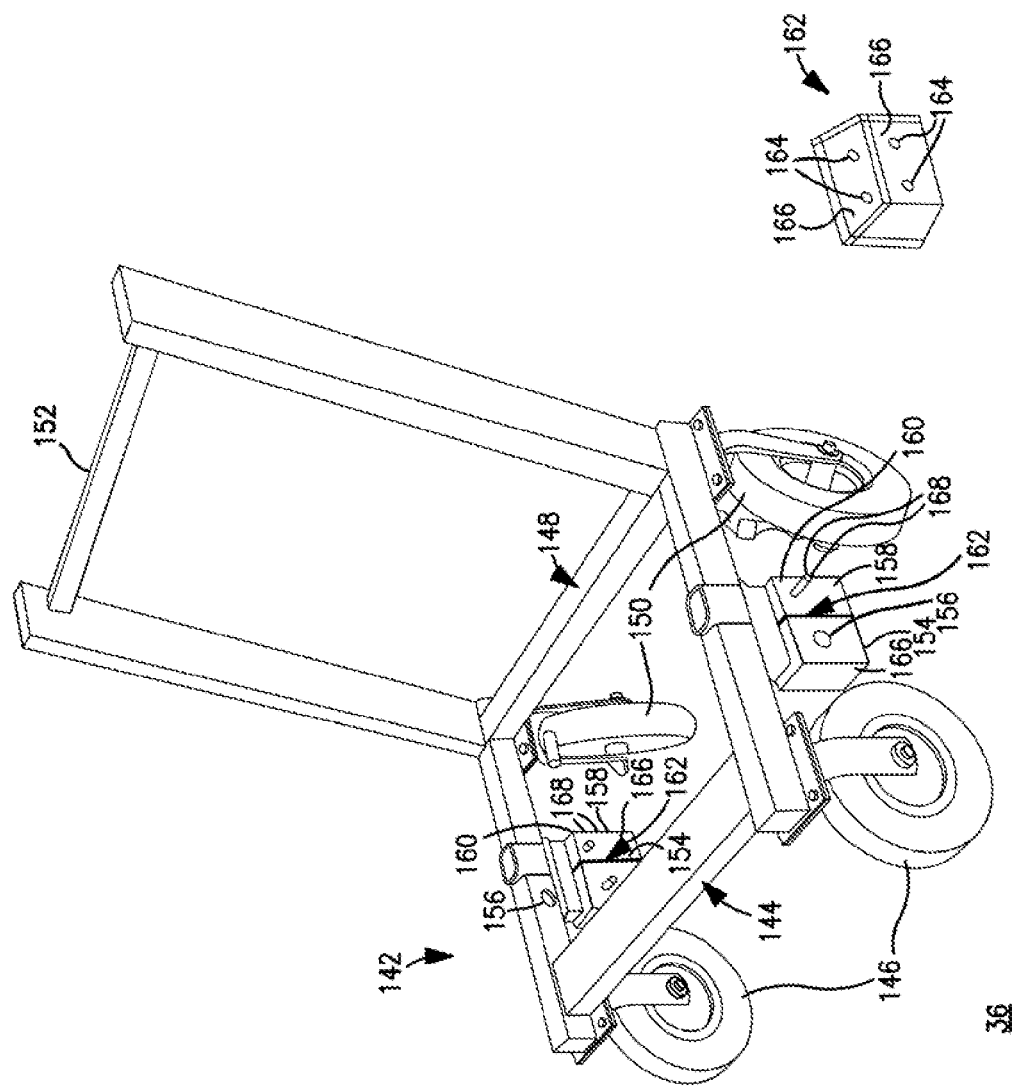

TILE LAYING MACHINE AND A METHOD OF USE

FIELD OF THE INVENTION

This invention relates to a tile laying machine and a method of use.

BACKGROUND OF THE INVENTION

Various kinds of tiles have been used in home, retail and industrial construction for centuries. Some tiles are produced by baking clay. A ceramic tile is a very common tile used for floors and bathroom walls. Other kinds of tiles include but are not limited to: vinyl tiles, plastic tiles, stone tiles, bricks, roof shingles, roof panels, wall panels, wall siding, tiles composed of two or more different materials, etc. The individual tiles can vary in size, shape, weight, geometrical form, thickness, composition, etc. The individual tiles can be plain in appearance or contain a unique texture, pattern or surface geometry. It is also possible to paint or decorate individual tiles, if desired. Many tiles are square in shape and can vary in dimensions from a 1 inch square up to about 16 inch squares. For some retail and industrial applications, the tiles can be larger, say having 20 inch squares or even 24 inch squares. Rectangular shape tile are also prevalent and can vary in dimensions. For example, a rectangular tile used in a residential bathroom could be 6 inches by 10 inches. Tiles having other geometrical shape are not as common but do exist. For example, a triangular shaped tile can be used to form a decorative border.

Tiles are usually installed manually, one at a time, by a skilled craftsman, such as a mason. The underlying surface can vary but is usually a concrete floor for retail and industrial buildings, and some type of composite board, green board, etc. positioned over plywood in residential construction. Usually, the underlying surface is poured or constructed so as to be essentially flat and planar. Alternatively, especially in forming the floor of a bathroom shower, the underlying surface is tapered so that water from the shower head will flow down and toward a floor drain. The underlying surface is then covered or treated with a bonding material which will allow each tile to securely bond to the underlying surface. For example, the underlying surface can have an adhesive, glue, cement, mortar, etc. applied to it. This bonding material is usually applied evenly so as to completely cover the underlying surface. This bonding material is also applied manually.

It has been recognized that a tile laying machine could shorten the time and reduce the cost to install a tile floor in large square or rectangular shaped area. A tile laying machine would be very useful in installing a tile floor in a large box store that is being constructed, in a large hotel lobby, in the foyer of a convention center, or in a large rectangular or square shaped showroom for automobiles. In addition, since skilled craftsmen demand high wages and many are union workers, by reducing the number of people needed to install a tile floor, one can certainly reduce the overall cost. Furthermore, lifting, placing and positioning ceramic tiles over an extended period of time can cause a craftsman to experience muscle soreness, back problems, knee issues and fatigue. By having a machine do the heavy lifting, placing and positioning, one can extend the useful life of the skilled craftsman.

Now a tile laying machine has been invented along with a method of using it.

SUMMARY OF THE INVENTION

Briefly, this invention relates to a tile laying machine and a method of use. The tile laying machine includes a movable platform capable of moving along an X-X axis and a Y-Y axis. The tile laying machine also has a robotic assembly with four spaced apart joints, which include a base, a shoulder, an elbow and a wrist. The base joint is connected to the movable platform and the wrist joint is capable of being spaced farthest away from the movable platform. Each of the joints has 3600 of rotational motion. The tile laying machine further includes an effector having a first surface and an oppositely aligned second surface. The first surface is removable secured to the wrist joint. The effector has a first side, a second side, a third side and a fourth side, and the first side is perpendicularly aligned to the second side. The tile laying machine also has a suction cup mounted on the second surface of the effector which is connected to a vacuum source. The suction cup is capable to picking up, positioning and releasing a new tile relative to a first laid tile and a second laid tile. The first and second laid tiles each have an upper surface and each is aligned perpendicular to one another. The tile laying machine also includes first, second and third edge sensors. At least one of the three edge sensors is secured to the first side of the effector and is capable of detecting an edge aligned along an X-X axis of the first laid tile, and at least one of the three edge sensors is secured to the second side of the effector and is capable of detecting an edge aligned along a Y-Y axis of the second laid tile. The tile laying machine further includes first, second and third height sensors. At least one of the three height sensors is secured to the first side of the effector and is capable of detecting the height of the upper surface of the first laid tile, and at least one of the three height sensors is secured to the second side of the effector and is capable of detecting the height of the upper surface of the second laid tile.

The tile laying machine also includes a control mechanism for operating the robotic assembly, the vacuum source and the edge and height sensors. Lastly, the tile laying machine has a power source for supplying power to the control mechanism.

The method of using a tile laying machine includes constructing a movable platform capable of moving along an X-X axis and a Y-Y axis. The tile laying machine has a robotic assembly with four spaced apart joints. The joints include a base, a shoulder, an elbow and a wrist. The base joint is connected to the movable platform and the wrist joint is capable of being spaced farthest away from the movable platform. Each of the joints has 360° of rotational motion. The tile laying machine also has an effector having a first surface and an oppositely aligned second surface. The first surface is removable secured to the wrist joint. The effector has a first side, a second side, a third side and a fourth side, and the first side is perpendicularly aligned to the second side. The tile laying machine further has a suction cup mounted on the second surface of the effector which is connected to a vacuum source. The suction cup is capable to picking up, positioning and releasing a new tile relative to a first laid tile and a second laid tile. The first and second laid tiles each have an upper surface and each is aligned perpendicular to one another. The tile laying machine also has first, second and third edge sensors. At least one of the three edge sensors is secured to the first side of the effector and is capable of detecting an edge aligned along an X-X axis of the first laid tile, and at least one of the three edge sensors is secured to the second side of the effector and is capable of detecting an edge aligned along a Y-Y axis of the second laid tile. The tile laying machine also has first, second and third height sensors. At least one of the three height sensors is secured to the first side of the effector and is capable of detecting the height of the upper surface of the first laid tile, and at least one of the three height sensors is secured to the second side of the effector and is capable of detecting the height of the upper surface of the second laid tile.

The tile laying machine also has a control mechanism for operating the robotic assembly, the vacuum source and the edge and height sensors. Lastly, the tile laying machine has a power source for supplying power to the control mechanism. The method includes the steps of applying a bonding material to a planar surface and then manually laying a row of tiles and a column of tiles. The row is aligned perpendicular to the column and the row has a first laid tile and the column has a second laid tile. The first laid tile is offset from the second laid tile. The method also includes positioning the tile laying machine such that the first side of the effector is located within a predetermined distance of the X-X axis of the first laid tile, and the second side of the effector is located within a predetermined distance of the Y-Y axis of the second laid tile. The first, second and third pairs of wheels are then elevated such that the first, second and third stabilizers bear the entire weight of the tile laying machine. In this position, the tile laying machine is rendered stationary. The method also includes using the control mechanism to move the robotic assembly such that the suction cups are positioned above a new tile. The vacuum source is then activated to lift the new tile and move it into position adjacent the X-X axis of the first laid tile and the Y-Y axis of the second laid tile using data generated by the first, second and third edge sensors and by the first, second and third height sensors. The method then applies a pre-calculated force against the new tile and/or uses a height comparison of the new tile relative to the adjacent set tiles to set the new tile in the bonding material. Additional tiles are then individually picked up, positioned and set in place such that an entire area can be tiled.

The general object of this invention is to provide a tile laying machine. A more specific object of this invention is to provide a tile laying machine which can install tile faster and more accurately than a skilled craftsman.

Another object of this invention is to provide a tile laying machine which can reduce the time and cost of laying tile.

A further object of this invention is to provide a tile laying machine which can install tile on a horizontal surface as well as on a vertical surface.

Still another object of this invention is to provide a method of using the tile laying machine.

Still further, an object of this invention is to provide a portable tile laying machine that can be easily transported between job sites.

Other objects and advantages of the present invention will become more apparent to those skilled in the art in view of the following description and the accompanying drawings.

BRIEF DESCRIPTION OF THE DRAWINGS

FIG. 7 is a perspective view of the end of the robotic assembly setting a tile in place.

FIG. 8 is a perspective view of the tile laying machine having a cantilever storage area.

FIG. 9 is a perspective view of a carriage.

FIG. 10 is a perspective view of a hollow rectangular sleeve having a pair of openings formed therethrough.

DETAILED DESCRIPTION OF THE INVENTION

Figure 1:
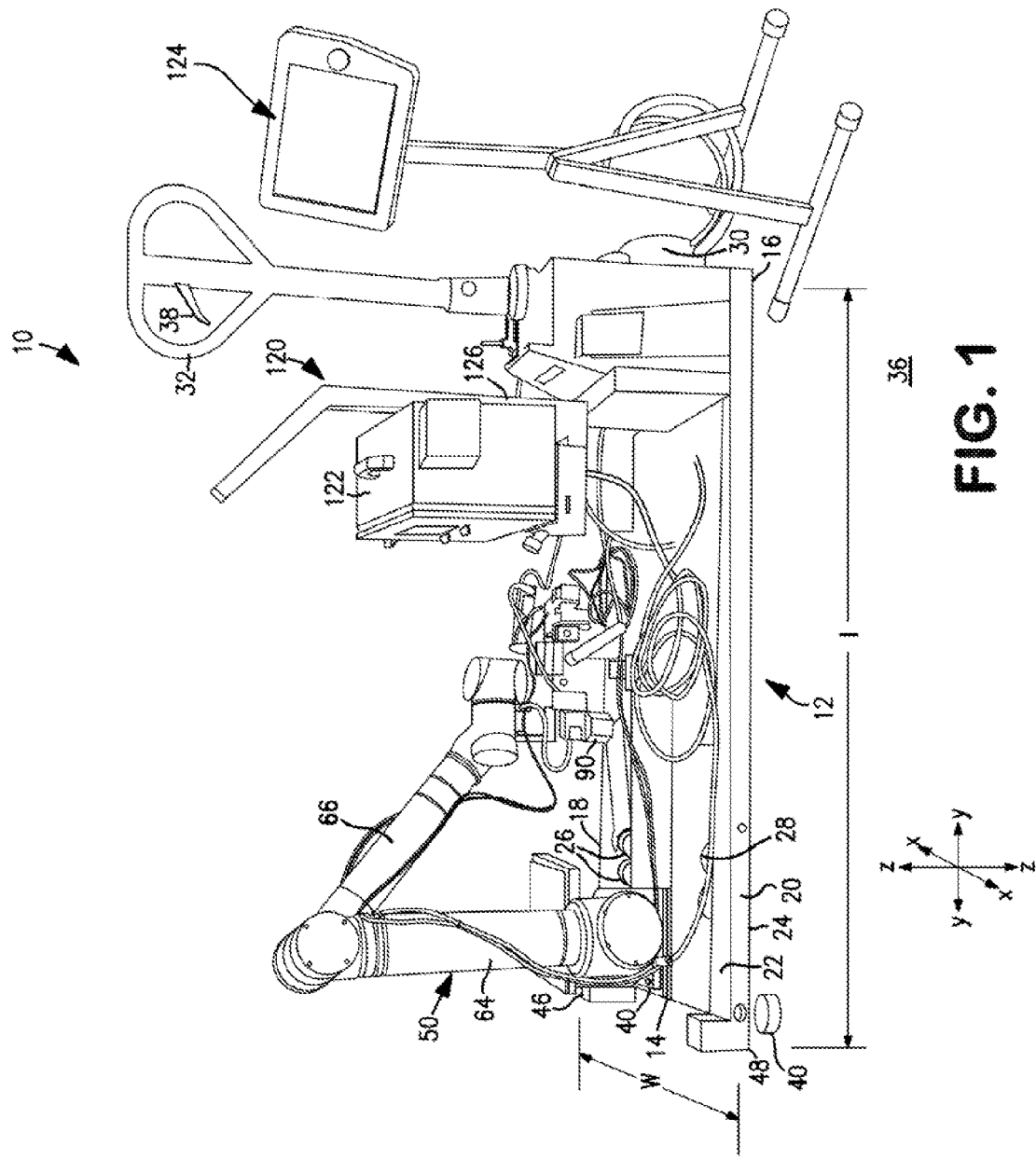
FIG. 1 is a perspective view of the tile laying machine.

Referring to FIG. 1, a tile laying machine 10 is shown which can set tiles in a desired pattern. By "tile" it is meant any kind of flooring, siding, roofing, or lining material which is a relatively thin, flat or convex shaped slab of hard material, such as baked clay or plastic, laid in rows to cover floors, walls, roofs, etc. A tile can vary in size, shape, weight, composition, geometrical form, thickness, etc. A tile could be a ceramic tile. By "ceramic" it is meant any of various hard, brittle, heat and corrosion-resistant materials made by shaping and then firing a nonmetallic mineral, such as clay, at a high temperature. The tile could also be a vinyl tile. By "vinyl" it is meant the univalent chemical radical $CH_2CH$; any of various easily polymerized compounds containing the vinyl radical, used as a basic material for plastics. The tile could further include but is not limited to: a clay tile, a plastic tile, a stone tile, a tile formed from a laminate, a wood tile, a glass tile, a tile formed from composite materials, a brick, a tile formed to look like a brick, a roof shingle, a roof panel, a wall panel, wall siding, etc. The tile can be formed from any known material. The tile can be formed from a single material or be formed from two or more different materials. The tile can be made from a natural material, a synthetic material or from a combination of both. The tile can vary in shape or configuration. The tile can be a square, a rectangle, a triangle or have some other geometrical or irregular shape provided it has an X-X axis and a Y-Y axis. The tile can vary in weight. The tile can weigh less than an ounce or weigh more than a pound. The tile can vary in thickness. The tile can have a thickness of a few millimeters or have a thickness greater than 0.125 inches. The tile can have a plain appearance or contain a texture, pattern or some other surface geometry. It is also possible to coat, paint, spray, submerge the tile in a solution, decorate or somehow treat the tile to alter its appearance. The tiles can be used to cover a floor, a wall, a ceiling, a roof, etc. The tiles can also be used to line the inside of a furnace, the inside of a tank used to hold a liquid, solution or chemical, the inside surface of a swimming pool, the walkway around a swimming pool, etc. The tiles can be secured to a flat surface, a planar surface, a curved surface, a tapered surface, a sloping surface, an arcuate surface, steps, etc. The tiles can be used in a residential home, such as the floor of a foyer, hall way, kitchen, utility room, or bathroom. The tiles can also be used to cover the floor, walls and ceiling of a room, such as a bathroom. The tiles can further be used to cover the floors, walls and/or ceilings of retail, industrial, governmental and educational buildings and structures. The tiles can further be used around at least a portion of the outer perimeter of a space craft, an airplane, an armored vehicle, etc. The tiles can be used in various kinds of construction or products known to man.

The tile laying machine 10 includes a movable platform 12 which is capable of moving along a longitudinal axis X-X and a transverse axis Y-Y. The movable platform 12 can also be constructed so as to move in three directions, along a longitudinal axis X-X, a transverse axis Y-Y and a vertical axis Z-Z, if desired. The movable platform 12 can vary in size, shape and construction. As shown in FIG. 1, the movable platform 12 has a first end 14, a second end 16, a first side 18 and a second side 20. The first end 14 is spaced apart from the second end 16, and the first side 18 is spaced apart from the second side 20. The movable platform 12 also has an upper surface 22 and a lower surface 24. The dimensions of the movable platform 12 can vary. The movable platform 12 has a length l and a width w. The length l can range from between about 2 feet to about 8 feet. Desirably, the length l ranges from between about 3 feet to about 7 feet. More desirably, the length l ranges from between about 4 feet to about 6 feet. Even more desirably, the length l is about 5 feet. The width w can range from between about 16 inches to about 50 inches. Desirably, the width w can range from between about 20 inches to about 40 inches. More desirably, the width w can range from between about 24 inches to about 32 inches. Even more desirably, the width w is about 28 inches.

The movable platform 12 can be constructed so as to be easily moved. This can be accomplished by using one or more wheels and/or tires. By "wheel" it is meant a solid disc or a rigid circular frame, designed to turn around a central axis; to turn around a central axis, revolve or rotate. By "tire" it is meant a covering for a wheel, usually made of rubber reinforced with cords of nylon, fiberglass or other material and filled with compressed air; a hoop of metal or rubber fitted around a wheel. As used throughout this application, the word "wheel" will encompass both a wheel and/or a wheel having a tire mounted on it. Besides, using one, two, three or more spaced apart wheels, one could also arrange the wheels in pairs so that the movable platform 12 is more stable.

The movable platform 12 is shown with first, second and third pairs of wheels, 26, 28 and 30 respectively. The two wheels making up each pair of wheels 26, 28 and 30 can be identical in size, shape, design, construction and material or they can be different. In addition, all three pairs of wheel 26, 28 and 30 can be of the same design or one or more of the pairs of wheels 26, 28 and 30 can be different. In FIG. 1 the first and second pairs of wheels 26 and 28 are depicted as being identical in size, shape and construction. Each of the first and second pairs of wheels, 26 and 28 respectively, is shown as consisting of two, cylindrically shaped wheels each mounted on an axle with one wheel positioned in front of the other wheel. It should be understood that the two wheels in a pair could be positioned side by side or be in some other arrangement. The first pair of wheels 26 is located adjacent to the first side 18 and inward from the first end 14. The second pair of wheels 28 is located adjacent to the second side 20 and inward from the first end 14. The distance the first and second pairs of wheels, 26 and 28 respectively, are located from the adjacent side and from the first end 14 can vary.

The third pair of wheels 30 is positioned outward from the second end 16 and midway between the first and second sides, 18 and 20 respectively. The third pair of wheels 30 is depicted as being constructed of rubber and having a disc shaped appearance. The third pair of wheels 30 has a larger diameter than either of the first or second pairs of wheels, 26 and 28 respectively. For example, the two wheels forming the third pair of wheels 30 have a diameter of about 8 inches. Any diameter wheel can be used but a larger diameter usually makes it easier to turn or rotate the wheel. The two wheels making up the third pair of wheels 30 also differ from the first and second pairs of wheels, 26 and 28 respectively, in that the two wheels making up the third pair of wheels 30 are positioned side by side and separated by about 3 inches. The third pair of wheels 30 is capable of turning or rotating through an arc in excess of 90°. Desirably, the third pair of wheels 30 can turn or rotate through an arc of from between about 0° to about 270°. More desirably, the third pair of wheels 30 can turn or rotate through an arc of from between about 0° to about 180°.

The first, second and third pairs of wheels, 26, 28 and 30 respectively, can be formed from various materials known to those skilled in the art. The first, second and third pairs of wheels 26, 28 and 30 respectively, can be formed of metal, steel, aluminum, wood, rubber, plastic, a composite material or a from a combination of two or more different materials. Some examples of wheels formed from different material include but are not limited to: metal wheels, steel wheels, rubber wheels, fiberglass wheels, nylon wheels, etc. The first, second and third pairs of wheels, 26, 28 and 30 respectively, can also vary in size, shape, design and construction. For example, one or more of the first, second and third pairs of wheels, 26, 28 and 30 respectively, can be roller shaped cylindrical wheels, disc shaped wheels, spherically shaped wheels, round wheels, caster wheels, etc. By "caster wheel" it is meant a small wheel mounted on a swivel.

Still referring to FIG. 1, the third pair of wheels 30 is controlled by a handle 32. The handle 32 can vary in size shape and design. The handle 32 is designed to turn or rotate and is mechanically connected to the third pair of wheels 30 such that as an operator turns the handle 32 to the right, the third pair of heels 30 will turn to the right by an equal distance. If the operator turns the handle 32 to the left, the third pair of wheels 30 will turn a like distance to the left. One skilled in the art can optionally utilize a gear mechanism whereby a small turn of the handle 32 could translate into a larger turn by the third pair of wheels 30, if desired.

Figure 2:
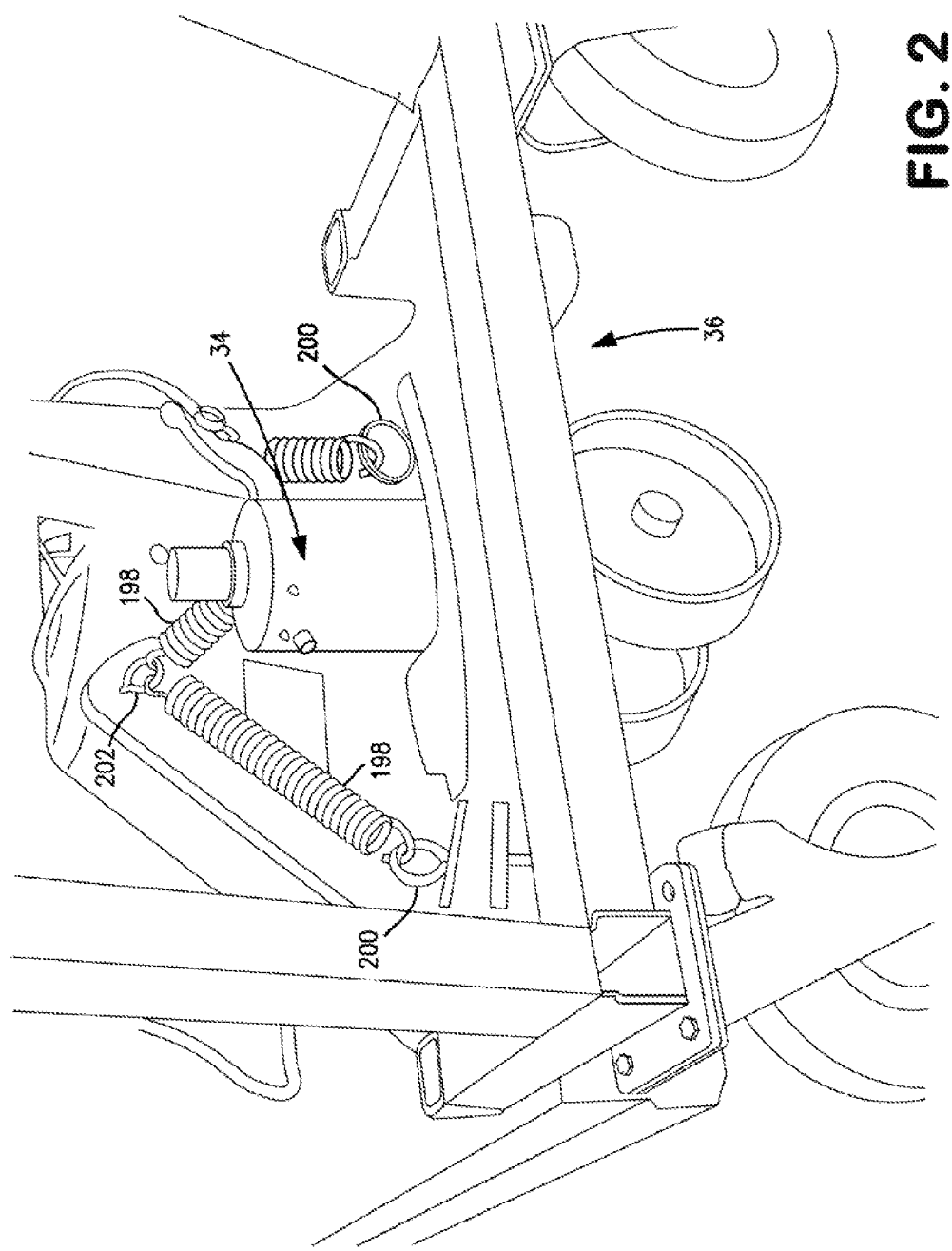
FIG. 2 is a perspective view of the second end of the tile laying machine showing the first hydraulic cylinder connected to the pump handle.

Referring to FIG. 2, the handle 32 is mechanically connected to a first hydraulic cylinder 34. The handle 32 is also pivoted such that it can be pumped or reciprocated up and down along the vertical axis Z-Z. This reciprocal movement of the handle 32 actuates the first hydraulic cylinder 34 and causes a piston rod connected thereto to incrementally advance outward from the first hydraulic cylinder 34. This pumping action of the handle 32 is similar to the pumping action of a hydraulic automobile jack. The handle 32 is also mechanically connected (not shown) to the first and second pairs of wheels, 26 and 28 respectively, such that reciprocating or pumping the handle 32 will cause the movable platform 12 to be elevated relative to an underlying surface 36. The underlying surface 36 is the concrete floor pictured in FIG. 2. The mechanical connection between the handle 32 and the first, second and third pairs of wheels, 26, 28 and 30 respectively, is well known to those skilled in the art and is commercially available from manufacturers of fork lift equipment.

Referring again to FIG. 1, the handle 32 is also equipped with a release lever 38. When an operator presses on the release lever 38, the hydraulic fluid in the first hydraulic cylinder 34 will be allowed to exit either to a reservoir or to the opposite side of the first hydraulic cylinder 34. As this occurs, the movable platform 12 will be lowered toward the underlying surface 36. This raising and lowering of the movable platform 12 occurs very quickly and the pumping action of the handle 32 requires only a small amount of force by an operator. Thus a single person can easily and quickly raise or lower the movable platform 12. In addition, the movable platform 12 can be easily maneuvered about the concrete floor in a building where tile is to be laid. The movable platform 12 is constructed to be moved by a single person who can push or pull the movable platform via the handle 32. Alternatively, the movable platform can be remotely operated by a person standing adjacent to it using a remote controller. Remote controllers are well known to those skilled in the art.

Figure 3:
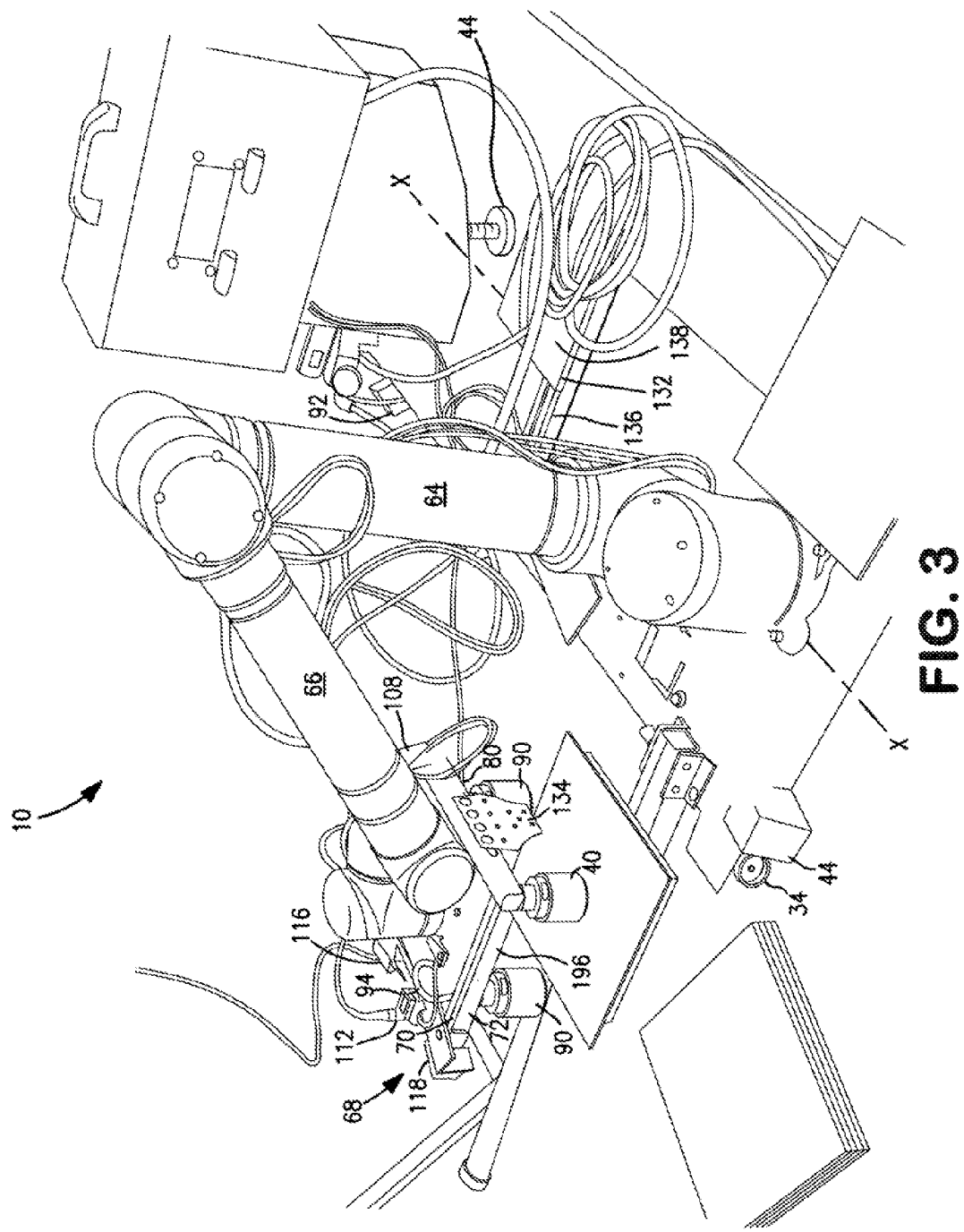
FIG. 3 is a perspective view of an effector attached to the robotic assembly and shows the third stabilizer.

Referring to FIGS. 1 and 3, the movable platform 12 is equipped with two or more stabilizers. The size, shape, configuration and number of stabilizers can vary. First, second and third stabilizers, 40, 42 and 44 respectively, are shown. Each of the first, second and third stabilizers, 40, 42 and 44 respectively, contains a vertically aligned, threaded stud (not shown) that engages with a threaded aperture (not shown) drilled and taped into the movable platform 12. The first stabilizer 40 is secured to the lower surface 24 of the movable platform 12 approximate a corner 46 formed by the junction of the first end 14 with the first side 18. The second stabilizer 42 is secured to the lower surface 24 of the movable platform 12 approximate a corner 48 formed by the junction of the first end 14 and the second side 20. The third stabilizer 44 is secured to the lower surface 24 of the movable platform 12 inward from the second end 16 and midway between the first and second sides, 18 and 20 respectively, see FIG. 3.

It should be understood that even though the tile laying machine 10 is shown having three stabilizers, 40, 42 and 44, that it is possible to utilize two larger dimensioned stabilizer or four or more stabilizers, if desired. The size, shape and construction of each of the stabilizers 40, 42 and 44 can vary. The first, second and third stabilizers, 40, 42 and 44 respectively, can be identical in size, shape and construction or one or more of them can vary in size, shape and construction from the remaining stabilizers. In addition, the amount of vertical travel of each stabilizer 40, 42 and 44, on its respective vertical threaded stud, can also vary. Typically, the amount of vertical travel of each stabilizer 40, 42 and 44, on the treaded stud, is from between about 1 inch to about 4 inches.

When the movable platform 12 is resting on the first, second and third stabilizers, 40, 42 and 44 respectively, the first, second and third pairs of wheels, 26, 28 and 30 respectively, can be raised off of the underlying surface 36. Alternatively, the first, second and third pairs of wheels, 26, 28 and 30 respectively, can be in contact with the underlying surface 36 but essentially do not carry any of the load of the tile laying machine 10. With the first, second and third stabilizers, 40, 42 and 44 respectively, in contact with the underlying surface 36, they will bear the entire weight of the tile laying machine 10. In this position, the tile laying machine 10 is rendered stationary and will not move in the longitudinal X-X or transverse Y-Y directions.

Figure 4:
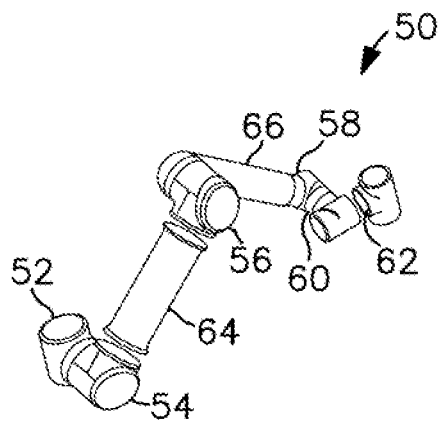
FIG. 4 is a schematic of the robotic assembly.

Referring to FIGS. 1, 3 and 4, the tile laying machine 10 also includes a robotic assembly 50. The robotic assembly 50 can vary in shape, design and construction. There are many commercial manufacturers of robotic equipment. One such manufacturer is Universal Robots having an office at Svendborgvej 102, Odense, Denmark. The robotic assembly 50 is a machine that can be programmed to move a tool, a device, a fixture, etc. The robotic assembly 50 can be programmed to communicate with other machines using electrical signals. The robotic assembly 50 can be formed from various materials. Extruded aluminum tubes are useful for forming the arms and joints. The robotic assembly 50 must have at least four spaced apart joints 52, 54, 56 and 58. Desirably, the robotic assembly 50 includes five or more joints 52, 54, 56, 58 and 60. More desirably, six joints 52, 54, 56, 58, 60 and 62 are utilized. The six joints include a base joint 52, a shoulder joint 54, an elbow joint 56, a first wrist joint 58, a second wrist joint 60 and a third wrist joint 62. When four joints are utilized, they include a base joint 52, a shoulder joint 54, an elbow joint 56 and a first wrist joint 58. The base joint is where the robotic assembly 50 is mounted to the movable platform 12. As shown in FIG. 1, the robotic assembly 12 should be secured to a front portion of the movable platform 12 approximate the first end 14. Desirably, the robotic assembly 50 is secured along the longitudinal central axis X- of the tile laying machine 10, see FIG. 3. The reason for this is that it will insure that the weight of the robotic assembly 50 is evenly distributed across the width w of the movable platform 12.

It should be understood that the robotic assembly 50 could be mounted or secured to the movable platform 12 away from the longitudinal central axis X-X, if one so desires.

Referring to FIG. 4, the robotic assembly 50 clearly depicts a base joint 52, a shoulder joint 54, an elbow joint 56, a first wrist joint 58, a second wrist joint 60 and a third wrist joint 62. The terminal or outermost wrist joint 62 is used to support a tool, device, fixture, etc. The third wrist joint 62 is capable of being spaced the farthest away from the movable platform 12. Each of the four or more joints, 52, 54, 56, 58, 60 and 62 has 360° of rotational motion. This means that each joint 52, 54, 56, 58, 60 and 62 can rotate a full 360°. This feature is important when one needs to move and position a new tile adjacent to two perpendicularly aligned tiles that have already been set. By "set" it is meant that a tile has been bonded to an underlying structure, such as a floor, a concrete floor, a floor made of composite material, a vertical wall, a concrete wall, a wall formed from a composite material, a tapered wall, a plastered wall, a ceiling, a roof, steps, etc. A tile is normally set in position using a bonding material which has been smoothly and uniformly applied to the floor, wall or ceiling. For example, an adhesive, glue, cement, mortar, etc. can be used as the bonding material. It is also possible to weld, rivet or use mechanical fasteners when the tiles are metal tiles, such as roofing tiles. The bonding material is usually applied evenly so as to completely cover the underlying surface, i.e. floor, wall or ceiling, before the tile is set in place.

By coordinating the motion of each of the joints 52, 54, 56, 58, 60 and 62, the robotic assembly 50 can move a new tile around freely. The reach of the robotic assembly 50 can be varied by utilizing different length arms 64 and 66. Only two of the arms 64 and 66 have been given numbers. The arms are the tubular members located between each pair of joints 52 and 54, 54 and 56, 56 and 58, 58 and 60, and 60 and 62. Five arms are situated between the five pairs of joints. The arm 64 is located between the shoulder joint 52 and the elbow joint 54 and serves as the vertical mast in our robotic assembly 50. The arm 66 is located between the elbow joint 54 and the first wrist joint 56 and is typically the longest arm segment. The actual length of each arm can vary. Typically, the arms are of various lengths. The overall configuration of the arms and joints must be able to support the weight of the device used to pick up the new tiles and as well as the weight of the new tile itself.

Referring again to FIG. 3, the tile laying machine 10 also includes an effector 68. By "effector" it is meant a device used to produce a desired change in an object in response to input. The effector 68 has a first surface 70 and an oppositely aligned second surface 72. The first surface 70 is removable secured to one of the outermost wrist joint, 58, 60 or 62, depending on how many wrist joints are being used. In FIG. 3, the effector 68 is attached to the third wrist joint 62. The effector 68 can vary in shape. The effector 68 has a first side 74, a second side 76, a third side 78 and a fourth side 80. The first side 74 is perpendicularly aligned to the second side 76. Desirably, the effector 68 has a square configuration wherein each of the sides 74, 76, 78 and 80 are of equal length and adjoining sides 74, 76, 78 and 80 are aligned at a 90° angle when the tile being laid is a typical square tile, such as a floor tile. The effector 68 can be rectangular in shape if it is being used to set an elongated tile, such as a vinyl, wood or laminate floor or wall tile. The tile laying machine 10 is capable of laying tiles having a tongue and groove connection, a snap connection, an intermeshing or inter-engaging connection, or a tile that has to be angled during installation to a set tile in order to form a locking joint, etc. The tile laying machine 10 can also install tiles that need to be offset or overlapped from one another, such as roof shingles, wood shingles, etc. By "shingle" it is meant a thin oblong piece of material, such as wood, that is laid in overlapping rows to cover the roof or sides of a house or other building.

It should be understood that the effector 68 can vary in size, shape and configuration depending upon the overall length and width of the tile, the weight of the tile, the material from which the tile is constructed, etc. The effector 68 can be constructed out of various materials. Common materials include but are not limited to: metal, steel, aluminum, composite material, etc.

Figure 5:
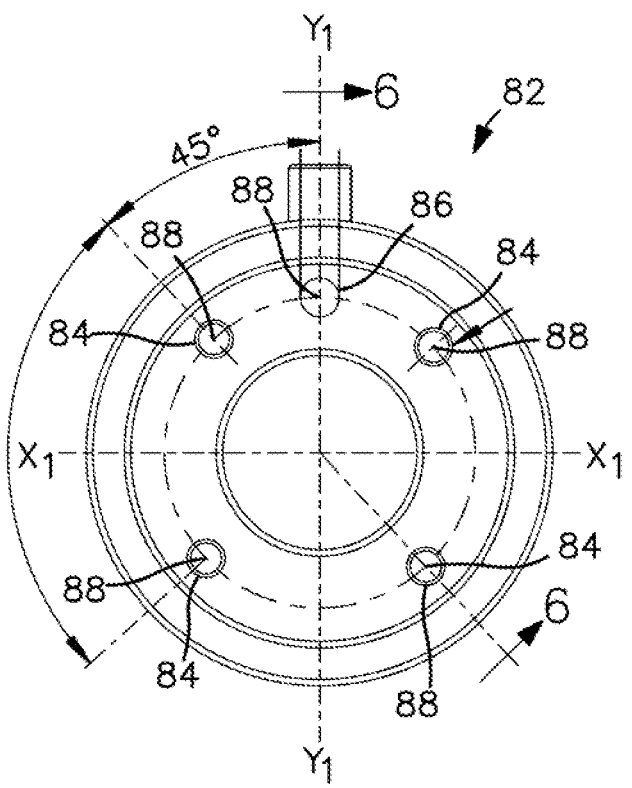
FIG. 5 is a front view of an alignment plate.
Figure 6:
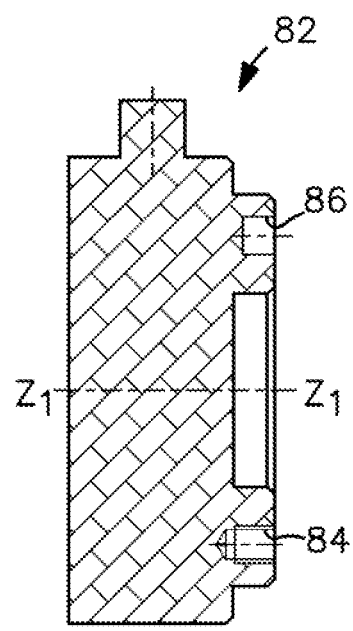
FIG. 6 is a cross-sectional view of the alignment plate shown in FIG. 5 taken along line 6-6.

Referring to FIGS. 5 and 6, the tile laying machine 10 can include an alignment plate 82 positioned between the outermost wrist joint, 58, 60 or 62 and the first surface 70 of the effector 68. The alignment plate 82 has a longitudinal central axis $X_1$-$X_1$, a transverse central axis $Y_1$-$Y_1$, and a vertical central axis $Z_1$-$Z_1$. The alignment plate 82 has four threaded apertures 84, 84, 84 and 84, and a non-threaded aperture 86 formed therein which are aligned parallel to the vertical central axis $Z_1$-$Z_1$. Each of the five apertures 84, 84, 84, 84 and 86 have a center point 88 aligned on a circle having a common central axis $Z_1$-$Z_1$. In other words, the center point 88 of each of the five apertures 84, 84, 84, 84 and 86 is equally spaced from the central axis $Z_1$-$Z_1$. Each of the four threaded apertures 84, 84, 84 and 84 are separated by an arc of 90°. In other words, a threaded aperture 84 is spaced 90° away from an adjacent threaded aperture 84. The non-threaded aperture 86 is positioned half way between two of the threaded apertures 84, 84. In other words, the non-threaded aperture 86 is spaced 45° from a threaded aperture 84. The size of the four threaded apertures 84, 84, 84 and 84 and the size of the non-threaded aperture 86 can vary. The non-threaded aperture 86 is designed to receive a pin (not shown) which is formed in the outermost wrist joint 58, 60 or 62. The outermost wrist joint is the third wrist joint 62 in FIG. 4. The engagement of the pin in the non-threaded aperture 86 ensures that the effector 68 will be properly aligned along the X-X axis of the outermost wrist joint 58, 60 or 62.

Referring again to FIG. 3, the tile laying machine 10 also includes one or more suction cups 90. Each suction cup 90 can vary in size, shape and design. When a plurality of suction cups 90 are utilize, each can be smaller in size than if one or two suction cups were used. Suction cups 90 are commercially available from various manufactures. VacMotion Inc. having an office at 34 Main Street, Plymouth, Mass. 02360 is one such supplier of suction cups 90. The suction cup 90 can vary in design. Round cups are best suited to smooth, flat surfaces. They will grip and release quickly. These cups hold their shape with extended use and grip well to vertical surfaces. Round cups with cleats are better at lifting heavy loads. Cups without cleats can be used for light lifting. Oval cups provide the most vacuum due to the larger surface area that contacts the tile. They provide more vacuum power than round cups and are suited to lifting heavy loads. They are designed to handle flat rigid sheet materials like wood, glass and composites. Bellow cups are best suited to textured, uneven surfaces. The folds, called "convolutions" provide a collapsible area that allows the cup to quickly compress when it touches the flat surface. The time needed to attach and release a tile when using bellow cups is greater due to the significant volume of the cup.

The weight that a suction cup 90 can lift and hold at a given pressure can vary. The weight of an individual tile can range from less than an ounce to more than a pound. Some roofing tile or siding tile can weight several pounds.

Desirably, four suction cups 90, 90, 90 and 90 are used, each arranged approximate a corner of a square floor tile. Three of the four suction cups 90, 90, 90 and 90 are visible in FIG. 3. However, if an elongated tile having a length of about 4 feet and a width of about 6 inches is being laid, it would be advantageous to space the three or more suction cups 90, 90 and 90 in a linear fashion at from between about 6 inches to about 12 inches apart. The number and arrangement of the suction cups can vary. The suction cups 90, 90, 90 and 90 are mounted or attached to the second or lower surface 70 of the effector 68. It is advantageous to space the suction cups 90, 90, 90 and 90 apart from one another so that the load of the individual tile is evenly distributed.

It should be understood that the tile laying machine 10 can be designed such that all of the available suction cups, whether it be one, two, three four, five or more will cooperated to pickup, move and hold a single tile. Alternatively, the tile laying machine 10 can be designed such that each of the four suction cups 90, 90, 90 and 90 can pickup, move, position and hold an individual tile. Another option is to use two of the four suction cups 90, 90 to pickup, move and hold a single tile while the remaining two suction cups 90, 90 can pickup, move and hold a second tile. The overall size and weight of each tile certainly has to be factored in to such a design.

Still referring to FIG. 3, each of the four suction cups 90, 90, 90 and 90 is connected to a vacuum source 92 via a vacuum line 94. The vacuum source can be a vacuum pump or some other device that can create a vacuum. The vacuum can be controlled such that is can be intermittent. By creating a vacuum and routing it to the four suction cups 90, 90, 90 and 90 one can pickup, hold, move and position a tile. The tile laying machine 10 also has the ability to press the tile down into the cement or mud used to set the tile or to press the tile against an adhesive such that it can be bonded to the substrate, whether that be a floor, a wall, a ceiling, the side of a building or a roof being placed on a building. By releasing or cutting off the vacuum, the suction cups 90, 90, 90 and 90 can release their hold on the tile when the tile is in the proper location where it needs to be set. The suction cups 90, 90, 90 and 90 are capable to picking up, moving, positioning, holding and releasing a tile relative to an X-X axis of a first laid tile and a Y-Y axis of a second laid tile. The suction cups 90, 90, 90 and 90 are also capable of releasing a tile relative to an X-X axis of a first laid tile and a Y-Y axis of a second laid tile even when the X-X axis is offset from the edge of the first laid tile. For example, the tile laying machine 10 can set a roof tile in an overlapping arrangement relative to a previous set roofing tile.

In addition, the suction cups 90, 90, 90 and 90 can applied the correct amount of pressure to the upper surface of the tile to cause it to be aligned to the height of the neighboring tiles which have already been set. Each of the four suction cups 90, 90, 90 and 90 is capable of picking up, moving, positioning and releasing a tile, or two or more tiles simultaneously, and applying a downward force of from between about 10 Newton meter (Nm) to about 150 Nm to set the tile against a bonding material. By "Newton" it is meant the unit of force required to accelerate a mass of one kilogram one meter per second per second, equal to 100,000 dynes.

Referring to FIG. 7, a first laid tile 96 having an upper surface 98 and a second laid tile 100 having an upper surface 102 have been already set onto an underlying substrate 36, i.e. a concrete floor, using a adhesive, cement, mud, or some other bonding material.

As noted above, a metal tile, such as a roofing tile can be set using welds, rivets or mechanical fasteners.

A new tile 104 having an upper surface 106 is held by the four suction cups 90, 90, 90 and 90 of the tile laying machine 10. The new tile 104 is positioned relative to the X-X axis of the first laid tile 96 and the Y-axis of the second laid tile 100. The first laid tile 96 is aligned perpendicular to the second laid tile 100.

Referring to FIGS. 3 and 7, the tile laying machine 10 also includes first, second and third edge sensors, 108, 110 and 112 respectively. The first edge sensor 108 is pictured in FIG. 3 and the second and third edge sensors 110 and 112 are clearly shown in FIG. 7. At least one of the three edge sensors 108, 110 and 112 is secured to the first side 74 of the effector 68 and at least one of the edge sensors 108, 110 and 112 is secured to the second side 76 of the effector 68. In FIG. 7, two of the edge sensors 108 and 110 are mounted or attached to the first side 74 of the effector 68 and the third edge sensor 112 is secured or attached to the second side 76 of the effector 68. Alternatively, the edge sensor 108 could be secured to the first side 74 of the effector 68 and the remaining two edge sensors 110 and 112 could be secured to the second side 76 of the effector 68. At least one of the three edge sensors 108, 110 and 112 is secured to the first side 74 of the effector 68 and is capable of detecting an edge aligned along an X-X axis of the first laid tile 96. At least one of the three edge sensors 108, 110 and 112 is secured to the second side 76 of the effector 68 and is capable of detecting an edge aligned along a Y-Y axis of the second laid tile 100. All three edge sensors 108, 110 and 112 can be utilized sequentially or simultaneously. Three edge sensors 108, 110 and 112 are needed to establish a 3 point triangular system for correctly positioning the new tile 104 relative to the first and second laid tiles 96 and 100.

It should be understood that even though the present description teaches positioning a new tile 104 relative to the X-X edge and the Y-Y edge of first and second laid tiles, 96 and 100 respectively, the tile laying machine 10 is also capable of positioning a new tile 104 relative to an X-X edge and a Y-Y edge of two perpendicularly aligned members. The two members can be wood or metal forms, be an edge having a depth dimension, be an existing vertical wall, etc. In addition, the tile laying machine 10 is further capable of positioning a new tile 104 in an overlapping or offset pattern relative to an X-X edge and a Y-Y edge of two previously laid tiles or members. Furthermore, the tile laying machine 10 is capable of positioning a new tile 104 at a set distance away from an existing X-X edge and an existing Y-Y edge of two previously laid tiles or members. This is very useful when grout line, having a thickness of about 0.25 inches is required between adjacent tiles.

The three edge sensors 108, 110 and 112 can be any of a variety of commercially available sensors. The three edge sensors 108, 110 and 112 can be light sensors, photo sensors, laser sensors, etc. A company that sells sensors is Schmitt Industries, Inc. having an office at 2765 NW Nicolai Street, Portland, Oreg. 97210. Schmitt Industries, Inc. sells a model of laser sensors under the trademark "Acuity". Another company that sells sensors is Bytewise having an office at 1150 Brookstone Center Parkway, Columbus, Ga. 31904. Bytewise sells laser sensors under the name "Cross Check". A third company that sells sensors is SICK AG having an office at ErwinpSick-Str. 1, 79183 Waldkirch, Germany. Still another company that sells sensors is Micro-Epsilon having an office at 8120 Brownleigh Drive, Raleigh, N.C. 27617.

It should be noted, that when a laser sensor is utilized, a computer switch with an I.P. address is needed. Those skilled in the laser arts will be aware of the various components needed to make the laser sensors operate properly.

Still referring to FIG. 7, the tile laying machine 10 further includes first, second and third height sensors, 114, 116 and 118 respectively. At least one of the three height sensors 114, 116 and 118 is secured to the first side 74 of the effector 68 and is capable of detecting the height of the upper surface 98 of the first laid tile 96. In FIG. 7, one height sensor 114 is mounted or attached to the first side 74 of the effector 68 and the two remaining height sensors 116 and 118 are secured or attached to the second side 76 of the effector 68. Alternatively, two height sensors 114 and 116 could be secured to the first side 74 of the effector 68 and the remaining height sensor 118 could be secured to the second side 76 of the effector 68. At least one of the three height sensors 114, 116 and 118 is secured to the second side 76 of the effector 68 and is capable of detecting the height of the upper surface 102 of the second laid tile 100. All three height sensors 114, 116 and 118 are utilized sequentially or simultaneously. Three height sensors 1114, 116 and 118 are needed to establish a 3 point triangular system for correctly positioning the upper surface 106 of the new tile 104 relative to the height of the first and second laid tiles 96 and 100.

The three height sensors 114, 116 and 118 can be any of a variety of commercially available sensors. The three height sensors 114, 116 and 118 can be light sensors, photo sensors, laser sensors, etc. Height sensors are available from the four companies listed above.

It should be understood that each of the first, second and third edge sensors, 108, 110 and 112 can be a photo sensor or a laser sensor. Likewise, each of the first, second and third height sensors, 114, 116 and 118 can be a photo sensor or a laser sensor. All of the sensors 108, 110 and 112, 114, 116 and 118 can be either photo sensors or laser sensors. Another option is to use some of each kind of sensor for both the edge sensors and for the height sensors.

Referring again to FIG. 1, the tile laying machine 10 further includes a control mechanism 120 for operating the robotic assembly 50, the vacuum source 92, the three edge sensors 108, 110 and 112, and the three height sensors 114, 116 and 118. The control mechanism 120 can include a computer 122 and a computer touch pad 124. Alternatively, the control mechanism 120 can be connected to a computer 122 such that it can activate the computer 122 when needed.

Software designed for operating the tile laying machine 10 is loaded into the computer 122. An operator can control the movement of the robotic assembly 50 by using the touch pad 124. Alternatively, an operator could type or key information into the computer 122 using a key pad. The vacuum source 92 can be turned on and off manually or automatically by entries received by the computer 122 from the three edge sensors 108, 110 and 112, and from the three height sensors 114, 116 and 118. Those skilled in the computer art are knowledgeable on how to write software and program the computer to perform the intended operation.

The tile laying machine 10 also has a power source 126. The power source 126 can be a battery or some other type of power. When the power source 126 is a battery, it can be situated on the movable platform 12. Alternatively, the power source 126 can be an electrical outlet and an electrical cord (not shown) can be connected between the electrical outlet and the control mechanism. The power source 126 supplies power to the control mechanism 120, i.e. the computer, the computer touch pad, the vacuum pump, power to operate the edge and height sensors 108, 110, 112, 114, 116 and 118.

Referring to FIG. 8, the tile laying machine 10 can include a storage area 128 which is mounted on the movable platform 12. The storage area 128 can vary in size and shape. Desirably, the storage area 128 is a flat member. The storage area 128 can be located within the perimeter of the upper surface 22 of the movable member 12. In this embodiment, several stacks of new tiles 104 could be positioned in easy reach of the robotic assembly 50. The number of new tiles 104 that can be held in the storage area 128 can vary. The number of new tiles 104 that can be stacked in the storage area 128 will depend on the type of tiles, the weight of the tiles, the thickness of the tiles, and the size and shape of the tiles. It is possible to store from 1 to several hundred new tiles 104 on the storage area 128. Alternatively, the storage area 128 can be attached to a movable member 130 such that it can project outward from the upper surface 22 in a cantilever fashion, as is depicted in FIG. 8. By "cantilever" it is meant a member, such as a beam, that projects beyond a fulcrum and is supported by a balancing member or a downward force behind the fulcrum. This storage area 128 can support a plurality of new tiles 104. The number of new tile 104 can vary. The storage area 128 shown in FIG. 8 can support a single stack of new tiles 104. The number of new tiles 104 that can be stacked on the storage area 128 will depend on the type of tiles, the weight of the tiles, the thickness of the tiles, and the size and shape of the tiles. For vinyl tiles, which are light weight and very thin, the storage area 128 could hold from 1 to about 200 tiles in a single stack.

The storage area 128 can be designed to hold multiple stacks of tile. For example, with different color tile, one stack could hold tile of a first color, a second stack could hold tile of a second color, a third stack could hold tile of a third color, etc.

The new tiles 104 will be individually picked up by the suction cups 90. By rotating and manipulating the arms 64 and 66, as well as the other arms of the robotic assembly 50, one can move and positioned a single new tile 104 into a desired alignment with two existing laid tiles 96 and 100. The new tile 104 will be properly positioned and then set into the adhesive, cement or other kind of bonding material. Alternatively, metal tiles could be welded, riveted, or set using mechanical fasteners.

The orientation of a new tile 104 can be adjusted to match up with exiting set tiles. For example, if the new tile 104 contains a particular grain pattern, or if different color new tiles 104 are being installed to create a unique pattern, then a bar code, logo or sticker could be applied to each new tile 104 and this information can be keyed into the computer. The suction cups 90 can pick up and correctly position a new tile 104 relative to adjacent set tiles so that a proper grain pattern, color pattern, etc. is obtained.

The suction cups 90 will then apply a force, such as a downward force when installing floor tile 104, to press the new tile 104 against the bonding material such that the upper surface 106 of the new tile 104 will horizontally match up with the uppers surfaces 98 and 102 of the first and second previously laid tiles, 96 and 100 respectively.

Referring again to FIG. 3, the tile laying machine 10 can further include a first locking member 132 and a second locking member 134. The first locking member 132 is secured to a support 136 secured to the movable platform 12. Desirably, the first locking member 132 is located midway between the first and second sides 18 and 20 of the movable platform 12. More desirably, the first locking member 132 is located along the longitudinal center line X-X. The first locking member 132 has a threaded aperture 138 formed therein. The second locking member 134 is secured to the fourth side 80 of the effector 68. The second locking member 134 is also depicted as a plate having at least one opening 140 formed therethrough. The first and second locking members, 132 and 134 respectively, are depicted as mating members that can be brought in physical contact with one another such that the opening 140 formed in the second locking member 134 is aligned with the threaded aperture 138 formed in the first locking member 132. A threaded stud or pin (not shown) can then be inserted through the opening 140 and be treaded into the threaded aperture 138 to secure the two locking members 132 and 134 together. The engagement of the first and second locking members, 132 and 134 respectively, prevents the robotic assembly 50 from moving when the tile laying machine 10 is transported between job sites or between work areas.

It should be understood that other types of locking mechanisms employing various types of mechanical connections and known to those skilled in the art could be utilized in place of the first and second locking members, 132 and 134 respectively, discussed above.

Referring now to FIG. 9, the tile laying machine 10 can further include a carriage 142. The carriage 142 is used to elevate the tile laying machine 10 from the underlying surface 36 and to make it easy to move the tile laying machine 10 from one location to another. The carriage 142 is especially useful when transporting the tile laying machine 10 between job sites or work areas where the underlying surface is not smooth or is rough. In FIG. 9, the carriage 142 is shown in a compact storage mode when it is not being used. The carriage 142 has a front section 144 with a pair of wheels 146 and a rear section 148 with a pair of wheels 150. Each pair of wheels 146 and 150 includes rather large wheels. By "large wheels" it is meant the wheels forming each pair of wheels 146 and 150 have a diameter of at least about 6 inches. Desirably, each wheel in the two pairs of wheels 146 and 150 has a diameter equal to or greater than about 7 inches. More desirably, each wheel in the two pairs of wheels 146 and 150 has a diameter equal to or greater than about 8 inches. Even more desirably, each wheel in the two pairs of wheels 146 and 150 has a diameter ranging from between about 8 inches to about 20 inches.

The carriage 142 also has an upwardly extending push handle 152 secured to the rear section 148. In addition, the front section 144 has a pair of dropdown members 154, 154 each having an aperture 156 formed therethrough, and the rear section 148 has a pair of dropdown members 158, 158 each having an aperture 160 formed therethrough.

Referring to FIGS. 9 and 10, the carriage 142 also utilizes a pair of hollow rectangular sleeves 162, 162. Each sleeve 162 is slid upward and surrounds one of the pairs of dropdown members 154 and 158 on opposite sides of the carriage 142. The pair of sleeves 162, 162 retains the front section 144 to the rear section 148 together, as is pictured in FIG. 9. Each of the pair of sleeves 162, 162 has a pair of openings 164 formed completely through two oppositely aligned side walls 166, 166 of each sleeve 162, see FIG. 10. One of the pair of openings 164, 164 is formed through the dropdown member 154 and the other opening 164 is formed through the dropdown member 158, on each side of the carriage 142. A pair of pins 168, 168 is positioned through the pair of openings 164, 164 on each side of the carriage 142.

Figure 11:
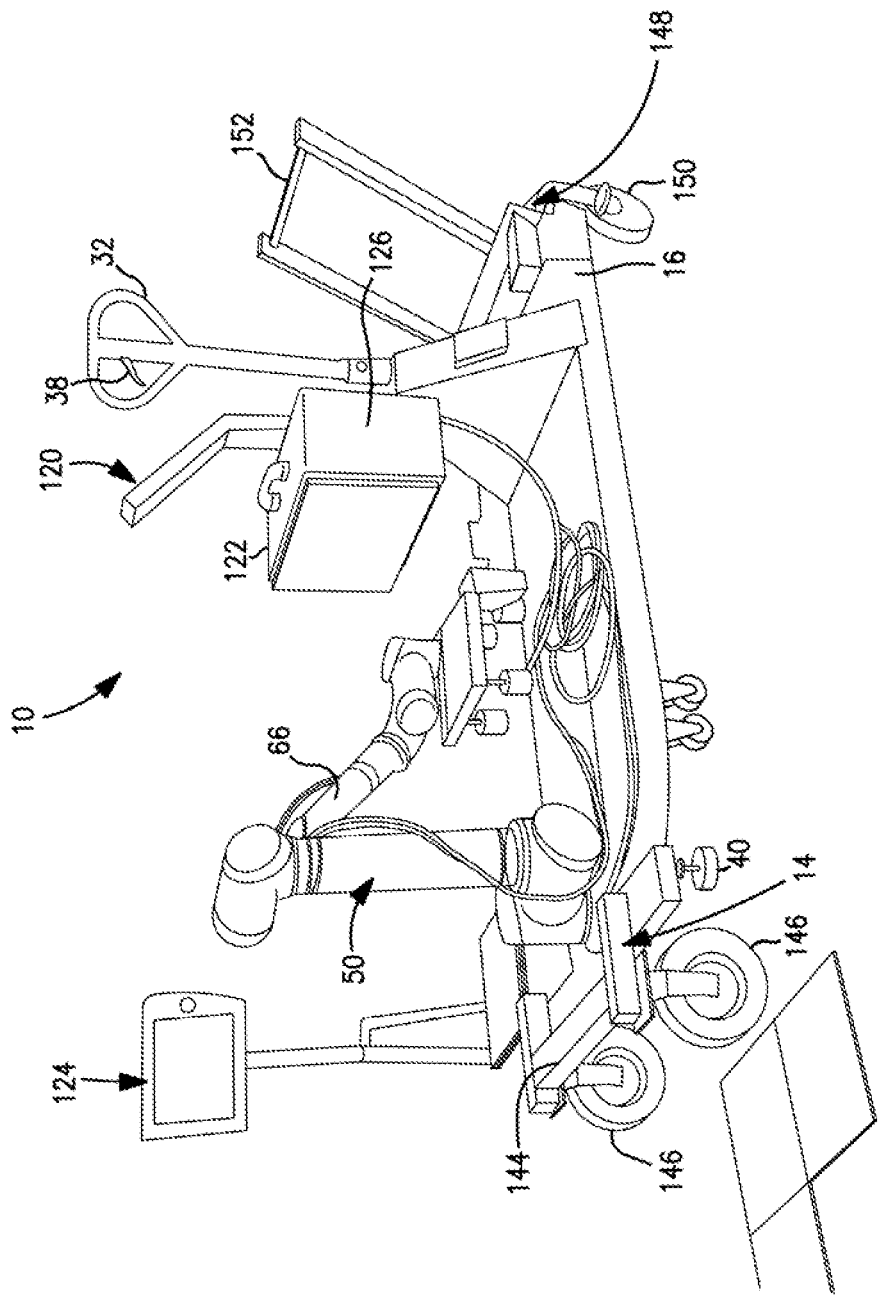
FIG. 11 is a perspective view of the tile laying machine supported on the carriage after the carriage has been divided into a front section and a rear section.

Referring to FIG. 11, the carriage 142 is shown having been separated into the front section 144 and the rear section 148 by removing the pair of pins 168, 168 from each side of the carriage 142. The pair of sleeves 162, 162 is then removed by sliding them downward off of the dropdown members 154 and 158 on each side of the carriage 142. The pair of sleeves 162, 162 are then stored in a safe place until needed again. The front section 144 is secured to the first end 14 of the movable platform 12 via the pair of dropdown members 154, 154 and the pair of pins 168, 168. The pair of pins 168, 168 will engage with openings (not shown) formed in the first and second sides, 18 and 20 respectively, of the movable platform 12. The rear section 148 is secured to the second end 16 of the movable platform 12 via the pair of dropdown members 158, 158 and the pair of pins 168, 168. The pair of pins 168, 168 will engage with openings (not shown) formed in the first and second sides, 18 and 20 respectively, of the movable platform 12. Since the pair of wheels 146 on the front section 144 and the pair of wheels 150 on the rear section 148 is large, they will cause the movable platform 12 to be elevated or raised up off of and away from the underlying surface 36. The push handle 152 provides an easy and convenient way to move the tile laying machine 10 around.

After the tile laying machine 10 has been transported to a new work area, the front and rear sections, 144 and 148 can be removed and reassembled into the mode or embodiment shown in FIG. 9.

Figure 12:
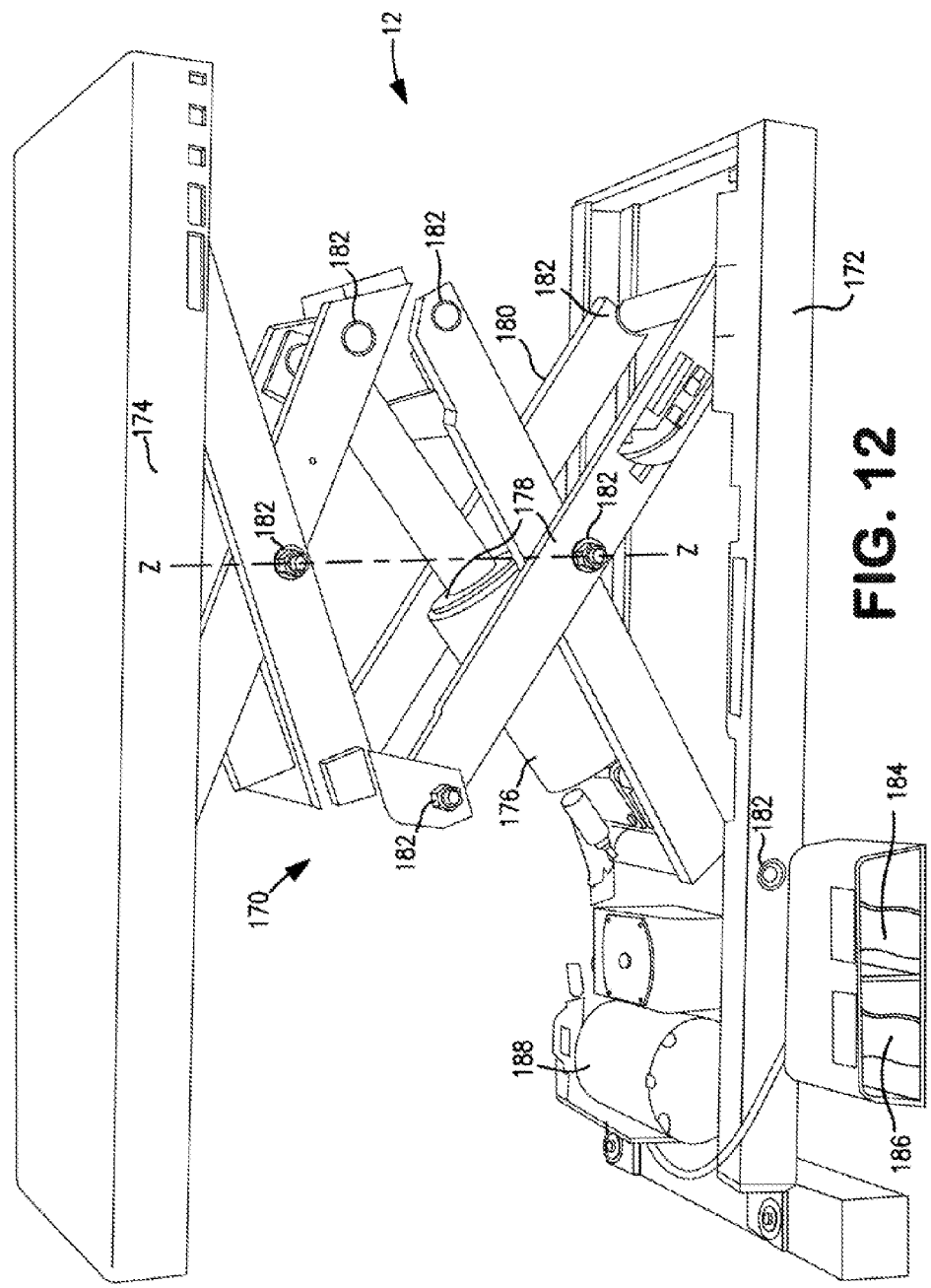
FIG. 12 is a perspective view of a scissor lift.

Referring to FIG. 12, the tile laying machine 10 can also include a scissor lift 170. The scissor lift 170 can be mounted to the movable platform 12. For example, the scissor lift 170 can be located between the upper and lower surfaces, 22 and 24 respectively, of the movable platform 12 or be positioned above the upper surface 22 or below the lower surface 24. If the scissor lift 170 is positioned above or below the upper or lower surfaces, 22 and 24 respectively, then minor reconfiguration may be required as to mounting the robotic assembly 50 and the first, second and third stabilizers, 40, 42 and 44 respectively. The scissor lift is a commercially available device. The scissor lift functions to raise or elevate the robotic assembly 50 such that it can reach a higher height. This is useful when applying tile to the upper regions of a wall or applying tile to a ceiling.

The scissor lift 170 includes a first member 172 mechanically linked to a second member 174 and having a hydraulic cylinder 176 positioned therebetween. A pair of extendable and retractable scissors 178 and 180 is aligned side by side. A plurality of spaced apart pivot rods 182 connects the pair of scissors together. The hydraulic cylinder 176 is attached to one of these pivot rods 182. The scissor lift 170 also has an up foot pedal 184 and a down foot pedal 186 which are electrically connected to an electric motor 188. Actuation of the up foot pedal 184 will cause the hydraulic cylinder 176 to raise the second member 174 vertically, along a Z-Z axis, relative to the first member 174 from an initial down position to a predetermined height. The scissor lift 170 can be constructed such that it can raise the second member 174 upward from the first member 172 by any desired height. Desirably, the second member 174 can be raised upward by at least about 60 inches from the first member 172. More desirably, the second member 174 can be raised upward by at least about 72 inches from the first member 172. Even more desirably, the second member 174 can be raised upward by at least about 84 inches from the first member 172. Most desirably, the second member 174 can be raised upward by at least about 90 inches from the first member 172.

Figure 13:
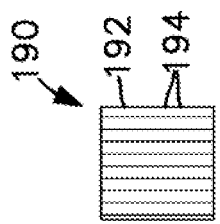
FIG. 13 is a top view of a single tile having a pattern formed on its upper surface.
Figure 14:
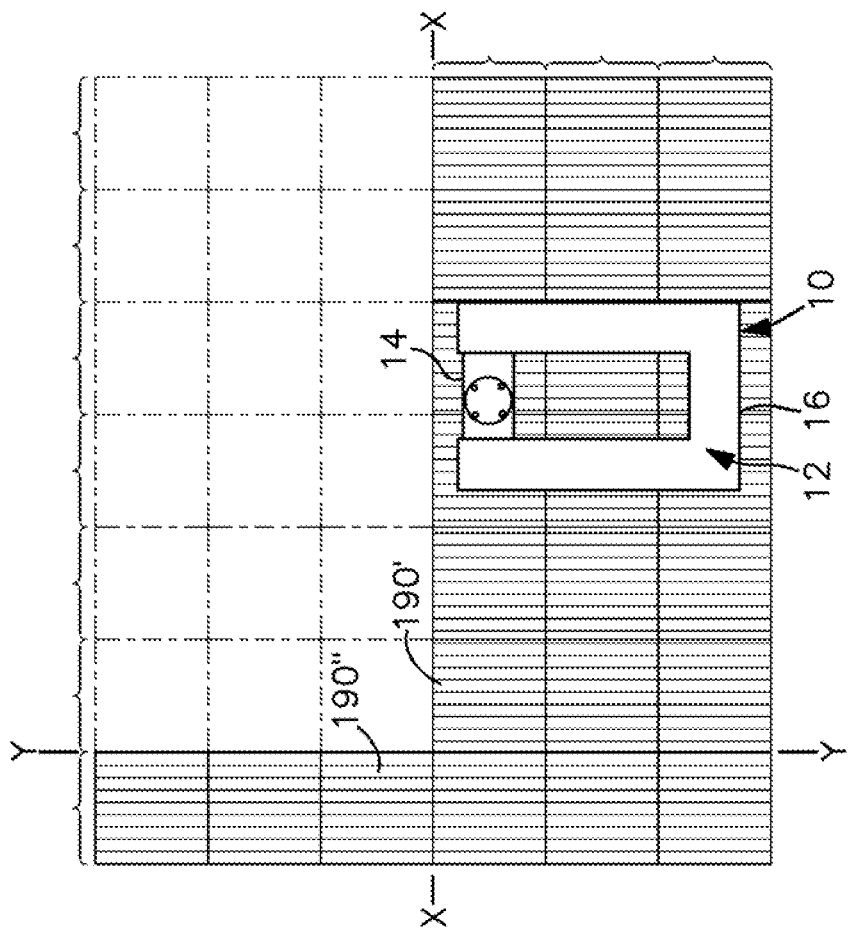
FIG. 14 is a top view of a tile floor having a number of installed tiles and having 18 squares where new tile needs to be set.

Referring now to FIGS. 13 and 14, a tile 190 is shown having an upper surface 192 with a grain pattern 194 formed therein. The patter 194 can be any pattern imaginable by a human being. In FIG. 13, the pattern 194 is depicted as a plurality of spaced apart, dashed lines aligned parallel to one another. In installing the tiles 194, 194, one may wish to alternate the pattern 194 on each tile 190 from horizontal and vertical, to provide an aesthetically pleasing design. This produces a 90° orientation as is shown in FIG. 14. Another option is to install the tiles 190, 190 such that the pattern 194 on each tile 190 is arranged parallel to the adjacent tiles 190, 190.

It should be understood that a tile could also have a unique texture or contain an image, design or picture on its upper surface which needs to be coordinated with adjacent tiles to form an overall patter, image or design. This is also possible using the tile laying machine 10 of this invention.

Referring to FIGS. 3 and 14, arranging the individual tiles 190, 190 in a particular pattern is possible by mounting a camera 196 to the effector 68. The camera 196 can vary in design and construction. Various manufactures sell cameras which could be utilized with this tile laying machine 10. The camera 196 is capable of taking an image of a grain pattern 194 formed in the upper surface 192 of a first laid tile 190', taking an image of a grain pattern 194 formed in the upper surface 192 of a second laid tile 190", and taking an image of a grain pattern 194 formed in an upper surface 192 of the to be installed tile 190 when the to be installed tile 190 is positioned relative to the X-X axis of the first laid tile 190' and the Y-Y axis of the second laid tile 190". These images are taken and compared to one another using the control mechanism 120 and the computer 122. The to be installed tile 190 is not released from the suction cups 90, 90, 90 and 90 until the images of the three grain patterns 194, 194 and 194 of tiles 190, 190' and 190" are compared to ensure that the grain pattern 194 in the to be installed tile 190 is properly aligned relative to the grain patterns 194, 194 in the first and second laid tile, 190' and 190"respectively.

As clearly depicted in FIG. 14, the grain pattern 194 in the to be installed tile 190 will be orientated 90° to the grain pattern 194 in the second laid tile 190".

Referring again to FIG. 2, a pair of springs 198, 198 is secured between upper surface 22 of the movable platform 12 and a point where a piston rod extending out of the first hydraulic cylinder 34 is connected to framework supporting the handle 32. A lower end of each of the pair of springs 198, 198 is attached to the movable platform 12 at attachment point 200 and an upper end of each of the pair of springs 198, 198 is attached to the framework supporting the handle 32 at attachment point 202. The pair of springs 198, 198 serve to urge the movable platform upward as the hydraulic fluid in the first hydraulic cylinder 34 is released. This means that the first, second and third pairs of wheels, 26, 28 and 30 will return to the underlying surface 36 quickly once the release lever 38 is activated.

METHOD

A method of using the tile laying machine 10 will be explained with reference to the Figures. The tile laying machine 10 has a movable platform 12 which is capable of moving along an X-X axis and a Y-Y axis. The tile laying machine also has a robotic assembly 50 with four spaced apart joints. The joints include a base joint 52, a shoulder joint 54, an elbow joint 56 and a wrist joint 58. The base joint 52 is connected to the movable platform 12 and the wrist joint 58 is capable of being spaced farthest away from the movable platform 12. Each of the joints 52, 54, 56 and 58 have 360° of rotational motion. The tile laying machine 10 also has an effector 68 having a first surface 70 and an oppositely aligned second surface 72. The first surface 70 is removably secured to the wrist joint 58. The effector 68 has a first side 74, a second side 76, a third side 78 and a fourth side 80. The first side 74 is perpendicularly aligned to the second side 76. A suction cup 90 is mounted on the second surface 72 of the effector 68. The suction cup 90 is connected to a vacuum source 92. The suction cup 90 is capable to picking up, positioning and releasing a new, to be installed, tile 104 relative to a first laid tile 96 and a second laid tile 100. Each of the first and second laid tiles, 96 and 100 respectively, each having an upper surface 98, 102 and each is aligned perpendicular to one another. The tile laying machine 10 also has first, second and third edge sensors, 108, 110 and 122 respectively. At least one of the three edge sensors 108, 110 and 112 is secured to the first side 74 of the effector 68 and is capable of detecting an edge aligned along an X-X axis of the first laid tile 96, and at least one of the three edge sensors 108, 110 and 112 is secured to the second side 76 of the effector 68 and is capable of detecting an edge aligned along a Y-Y axis of the second laid tile 100. All three edge sensors 108, 110 and 112 are utilized sequentially or simultaneously. The tile laying machine 10 further has first, second and third height sensors 114, 116 and 118. At least one of the three height sensors 114, 116 and 118 is secured to the first side 74 of the effector 68 and is capable of detecting the height of the upper surface 98 of the first laid tile, and at least one of the three height sensors 114, 116 and 118 is secured to the second side 76 of the effector 68 and is capable of detecting the height of the upper surface 102 of the second laid tile 100. All three height sensors 114, 116 and 118 are utilized sequentially or simultaneously. The tile laying machine 10 also has a control mechanism 120 for operating the robotic assembly 50, the vacuum source 92 and the edge and height sensors 108, 110 and 112 and 114, 116 and 118 respectively. Lastly, the tile laying machine 10 has a power source 126 for supplying power to the control mechanism 120. The method includes the steps of applying a bonding material to a planar surface. Then a row of tiles and a column of tiles are manually laid. The row is perpendicular to the column, and the row has a first laid tile 96 and the column has a second laid tile 100. The first laid tile 96 is offset from the second laid tile 100. The method also includes positioning the tile laying machine 10 such that the first side 74 of the effector 68 is located within a predetermined distance of the X-X axis of the first laid tile 96 and the second side 76 of the effector 68 is located within a predetermined distance of the Y-Y axis of the second laid tile 100. The predetermined distance can be about 2 inches. The first, second and third pairs of wheels 26, 28 and 30 respectively, are then elevated such that the first, second and third stabilizers, 40, 42 and 44 respectively, bear the entire weight of the tile laying machine 10. In this position, the tile laying machine 10 is rendered stationary. The method further includes using the control mechanism 120 to move the robotic assembly 50 such that the suction cups 90, 90, 90 and 90 are positioned above a new, to be installed, tile 104 and activating the vacuum source 92 to lift the to be installed tile and move it into position adjacent the X-X axis of the first laid tile 96 and the Y-Y axis of the second laid tile 100 using data generated by the first, second and third edge sensors, 108, 110 and 1122 respectively, and by the first, second and third height sensors 114, 116 and 118. The method further includes applying a pre-calculated force against said new, to be installed, tile 104 to set it in the bonding material. The control mechanism 120 can be programmed to pick up additional new, to be installed tiles 104 and set them one by one in a desired location.

The method can further include lowering the first, second and third pair of wheels, 26, 28 and 30 respectively, onto an underlying surface 36 thereby transferring the entire weight of the tile laying machine 10 to the wheels 26, 28 and 30 and making the tile laying machine 10 movable. In addition, the method can include positioning the tile laying machine 10 such that the first side 74 of the effector 68 is located within a predetermined distance of the X-X axis of a new, first laid tile 96 and the second side 76 of the effector 68 is located within a predetermined distance of the Y-Y axis of a new, second laid tile 100. The control mechanism 120 can be programmed to pick up additional new, to be installed tiles 104 and set them one by one in a desired location.

The method can also include preparing the tile laying machine 10 to be transported over uneven terrain by removably securing a front section 144 of a carriage 142, having a pair of large wheels 146, 146 to the first end 14 of the movable platform 12. A rear section 148 of the carriage 142, having a pair of large wheels 150, 150, is removably secured to the second end 16 of the movable platform 12. The tile laying machine 10 is then elevated away from the underlying surface 36.

The method can further include mounting a camera 196 on the effector 68 and using the camera 196 to take an image of a grain pattern 194 formed in the upper surface 192 of a first laid tile 190', to take an image of a grain patter 194 formed in the upper surface 192 of a second laid tile 190", and to take an image of a grain pattern 194 formed in an upper surface 192 of the new, to be installed, tile 190 when the new, to be installed, tile 190 is positioned relative to the X-X axis of the first laid tile 190' and the Y-Y axis of the second laid tile 190". The images are taken by the camera and are fed back to the control mechanism 120 and the computer 122 before the new, to be installed, tile 190 is released from the suction cups 90, 90, 90 and 90. The images of the three grain patterns 194, 194 and 194 are compared to ensure that the grain pattern 194 in the new, to be installed, tile 190 is properly aligned relative to the grain patterns 194, 194 in the first and second laid tile 190' and 190" respectively. Then a pre-calculated force is applied against the new, to be installed, tile 190 to set it in the bonding material.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A tile laying machine comprising:
a) a movable platform capable of moving along an X-X axis, a Y-Y axis and a Z-Z axis;
b) a robotic assembly having four spaced apart joints, said joints including a base, a shoulder, an elbow, and a wrist, said base joint being connected to said movable platform and said wrist joint capable of being spaced farthest away from said movable platform, and each of said joints having 360° of rotational motion;
c) an effector having a first surface and an oppositely aligned second surface, said first surface being removable secured to said wrist joint, said effector having a first side, a second side, a third side and a fourth side, and said first side is perpendicularly aligned to said second side;
d) a suction cup mounted on said second surface of said effector which is connected to a vacuum source, said suction cup capable of picking up, positioning and releasing a new tile relative to a first laid tile and a second laid tile, said first and second laid tiles each having an upper surface and each being aligned perpendicular to one another;
e) first, second and third edge sensors, at least one of said edge sensors secured to said first side of said effector and capable of detecting an edge aligned along an X-X axis of said first laid tile, and at least one of said edge sensors secured to said second side of said effector and capable of detecting an edge aligned along a Y-Y axis of said second laid tile;

f) first, second and third height sensors, at least one of said height sensors secured to said first side of said effector and capable of detecting the height of said upper surface of said first laid tile, and at least one of said height sensors secured to said second side of said effector and capable of detecting the height of said upper surface of said second laid tile;

g) a control mechanism for operating said robotic assembly, said vacuum source and said edge and height sensors; and h) a power source for supplying power to said control mechanism.

2. The tile laying machine of claim 1 wherein said first and second edge sensors and said first height sensor are secured to said first side of said effector and said third edge sensor and said second and third height sensors are secured to said second side of said effector.

3. The tile laying machine of claim 1 wherein said first edge sensor and said first and second height sensors are secured to said first side of said effector and said second and third edge sensors and said third height sensor are secured to said second side of said effector.

4. The tile laying machine of claim 1 further comprising a first locking member secured to said movable platform and a second locking member secured to said fourth side of said effector, said first and second locking members engaging one another to prevent said robotic assembly from moving when said tile laying machine is transported between job sites.

5. The tile laying machine of claim 1 wherein said movable platform further includes a first member mechanically linked to a second member and having a hydraulic cylinder positioned therebetween, actuation of said hydraulic cylinder causes said second member to move vertically, along said Z-Z axis, relative to said first member to a height of at least about 60 inches.

6. The tile laying machine of claim 1 further comprising a camera mounted on said effector, said camera capable of taking an image of a grain pattern formed in said upper surface of said first laid tile, taking an image of a grain pattern formed in said upper surface of said second laid tile, and taking an image of a grain pattern formed in an upper surface of a to be installed tile when said to be installed tile is positioned relative to said X-X axis of said first laid tile and said Y-Y axis of said second laid tile, but before said to be installed tile is released from said suction cup, said three grain pattern images being compared to ensure that said grain pattern in said to be installed tile is properly aligned relative to said grain patterns in said first and second laid tile.

7. The tile laying machine of claim 6 wherein said grain pattern in said to be installed tile is orientated 90° to said grain pattern in said second laid tile.

8. The tile laying machine of claim 1 wherein each of said first, second and third edge sensors and each of said first, second and third height sensors is a photo sensor.

9. The tile laying machine of claim 1 wherein each of said first, second and third edge sensors and each of said first, second and third height sensors is a laser sensor.

10. A tile laying machine comprising:

a) a movable platform capable of moving along an X-X axis, a Y-Y axis and a Z-Z axis, said movable platform having a first member mechanically linked to a second member and having a second hydraulic cylinder positioned therebetween, actuation of said second hydraulic cylinder causing said second member to move vertically, along said Z-Z axis, relative to said first member, said movable platform also having first and second ends, first and second sides, an upper surface and a lower surface, first, second and third pairs of spaced apart wheels, each of said first and second pairs of wheels positioned adjacent to one of said first and second sides and inward from said first end, and said third pair of wheels positioned outward of said second end and midway between said first and second sides, said third pair of wheels being controlled by a handle, a first stabilizer secured to said lower surface approximate a corner formed by said first end and said first side, a second stabilizer secured to said lower surface approximate a corner formed by said first end and said second side, and a third stabilizer secured to said lower surface inward from said second end and midway between said first and second sides, a first hydraulic cylinder connected between said movable platform and said handle whereby reciprocal movement of said handle causes said second hydraulic cylinder to raise said first, second and third pairs of wheels and said first, second and third stabilizers contact an underlying surface and bear the entire weight of said tile laying machine, and said tile laying machine is rendered stationary;

b) a robotic assembly having six spaced apart joints, said joints including a base, a shoulder, an elbow, a first wrist, a second wrist and a third wrist, said base joint being connected to said movable platform and said third wrist joint capable of being spaced farthest away from said movable platform, and each of said joints having 360° of rotational motion;

c) an effector having a first surface and an oppositely aligned second surface, said first surface being removably secured to said third wrist joint, said effector having a first side, a second side, a third side and a fourth side, and said first side is perpendicularly aligned to said second side;

d) a plurality of spaced apart suction cups mounted on said second surface of said effector, each of said suction cups being connected to a vacuum source, said suction cups capable of picking up, positioning and releasing a new tile relative to an X-X axis of a first laid tile and a Y-Y axis of a second laid tile, and each of said first and second laid tiles having an upper surface and each being aligned perpendicular to one another;

e) first, second and third edge sensors, at least one of said edge sensors secured to said first side of said effector and capable of detecting an edge aligned along an X-X axis of said first laid tile, and at least one of said edge sensors secured to said second side of said effector and capable of detecting an edge aligned along a Y-Y axis of said second laid tile;

f) first, second and third height sensors, at least one of said height sensors secured to said first side of said effector and capable of detecting the height of said upper surface of said first laid tile, and at least one of said height sensors secured to said second side of said effector and capable of detecting the height of said upper surface of said second laid tile;

g) a control mechanism for operating said robotic assembly, said vacuum source and said edge and height sensors; and h) a power source for supplying power to said control mechanism.

11. The tile laying machine of claim 10 wherein said control mechanism is activated by a computer having a software program loaded therein, and said movable platform having a storage area sized to support a plurality of to be installed tiles which can be individually picked up, positioned and released by said suction cups.

12. The tile laying machine of claim 10 wherein said each of said suction cups is capable of picking up, positioning and releasing a to be installed tile sequentially and applying a downward force of from between about 10 Nm to about 150 Nm to set said to be installed tile against a bonding material.

13. The tile laying machine of claim 10 further comprising a carriage having a front section with a pair of large wheels removably secured to said first end of said movable platform, and having a rear section with a pair of large wheels removably secured to said second end of said movable platform, said carriage elevating said tile laying machine away from said underlying surface.

14. The tile laying machine of claim 13 wherein said front section of said carriage is attached to said rear section of said carriage when said carriage is not attached to said tile laying machine.

15. The tile laying machine of claim 10 further comprising an alignment plate positioned between said third wrist joint and said effector, said alignment plate having four threaded apertures and a non-threaded aperture formed therein, each aperture having a center point aligned on a circle having a common central axis, each of said threaded apertures being separated by 90° and said non-threaded aperture positioned half way between two of said threaded apertures, and said non-threaded aperture engaging a pin formed in said third wrist joint such that said effector is aligned along an X-X axis with said third wrist joint.

16. A method of using a tile laying machine having a movable platform capable of moving along an X-X axis and a Y-Y axis; a robotic assembly having four spaced apart joints, said joints including a base joint, a shoulder joint, an elbow joint and a wrist joint, said base joint being connected to said movable platform and said wrist joint capable of being spaced farthest away from said movable platform, and each of said joints having 360° of rotational motion; an effector having a first surface and an oppositely aligned second surface, said first surface being removably secured to said wrist joint, said effector having a first side, a second side, a third side and a fourth side, and said first side is perpendicularly aligned to said second side; a suction cup mounted on said second surface of said effector which is connected to a vacuum source, said suction cup capable of picking up, positioning and releasing a to be installed tile relative to a first laid tile and a second laid tile, each of said first and second laid tiles having an upper surface and each being aligned perpendicular to one another; first, second and third edge sensors, at least one of said edge sensors secured to said first side of said effector and capable of detecting an edge aligned along an X-X axis of said first laid tile, and at least one of said edge sensors secured to said second side of said effector and capable of detecting an edge aligned along a Y-Y axis of said second laid tile; first, second and third height sensors, at least one of said height sensors secured to said first side of said effector and capable of detecting the height of said upper surface of said first laid tile, and at least one of said height sensors secured to said second side of said effector and capable of detecting the height of said upper surface of said second laid tile; a control mechanism for operating said robotic assembly, said vacuum source and said edge and height sensors; and a power source for supplying power to said control mechanism, said method comprising the steps of:
  a) applying a bonding material to a planar surface;
  b) manually laying a row of tiles and a column of tiles, said row being perpendicular to said column, and said row having a first laid tile and said column having a second laid tile, and said first laid tile being offset from said second laid tile;
  c) positioning said tile laying machine such that said first side of said effector is located within a predetermined distance of said X-X axis of said first laid tile and said second side of said effector is located within a predetermined distance of said Y-Y axis of said second laid tile;
  d) elevating said first, second and third pairs of wheels such that said first, second and third stabilizers bear the entire weight of said tile laying machine, and said tile laying machine is rendered stationary;
  e) using said control mechanism to move said robotic assembly such that said suction cups are positioned above a to be installed tile and activating said vacuum source to lift said tile and move it into position adjacent said X-X axis of said first laid tile and said Y-Y axis of said second laid tile using data generated by said first, second and third edge sensors and by said first, second and third height sensors;
  f) applying a pre-calculated force against said to be installed tile to set it in said bonding material; and
  g) repeating steps e and f to lay additional tiles.

17. The method of claim 16 wherein said predetermined distance is about 2 inches.

18. The method of claim 16 further comprising lowering said first, second and third pair of wheels onto said underlying surface thereby transferring the entire weight of said tile laying machine to said wheels and making said tile laying machine movable, positioning said tile laying machine such that said first side of said effector is located within a predetermined distance of said X-X axis of a new first laid tile and said second side of said effector is located within a predetermined distance of said Y-Y axis of a new second laid tile, and then repeating steps d through g.

19. The method of claim 16 further comprising preparing said tile laying machine to be transported over uneven terrain by removably securing a front section of a carriage, having a pair of large wheels, to said first end of said movable platform, and removably securing a rear section of said carriage, having a pair of large wheels, to said second end of said movable platform, and elevating said tile laying machine away from said underlying surface.

20. The method of claim 16 further comprising mounting a camera on said effector and using said camera to take an image of a grain pattern formed in said upper surface of said first laid tile, to take an image of a grain pattern formed in said upper surface of said second laid tile, and to take an image of a grain pattern formed in an upper surface of said to be installed tile when said tile is positioned relative to said X-X axis of said first laid tile and said Y-Y axis of said second laid tile, but before said to be installed tile is released from said suction cup, said images of said three grain patterns are compared to ensure that said grain pattern in said to be installed tile is properly aligned relative to said grain patterns in said first and second laid tile, and then applying a pre-calculated force against said to be installed tile to set it in said bonding material.

* * * * *